United States Patent [19]

Mongin et al.

[11] Patent Number: 4,598,677
[45] Date of Patent: Jul. 8, 1986

[54] ARRANGEMENT OF AUXILIARY EQUIPMENT UNITS FOR INTERNAL COMBUSTION ENGINED AUTOMOTIVE VEHICLES

[75] Inventors: Michel Mongin, Saint-Germain-en-Laye; Michel Jaccod, Champigny-sur-Marne, both of France

[73] Assignee: Valeo, Paris, France

[21] Appl. No.: 632,588

[22] Filed: Jul. 19, 1984

[30] Foreign Application Priority Data

Jul. 22, 1983 [FR] France ............................. 83 12178

[51] Int. Cl.⁴ .......................... F02F 7/00; B25G 3/28
[52] U.S. Cl. .................................. 123/195 A; 403/359
[58] Field of Search ................. 123/195 R, 195 A, 2; 403/359

[56] References Cited

U.S. PATENT DOCUMENTS

| | | | |
|---|---|---|---|
| 1,422,995 | 7/1922 | Link | 123/195 A |
| 1,447,371 | 3/1923 | Andrews et al. | 123/195 A |
| 2,079,724 | 5/1937 | Ranst | 123/195 A |
| 2,271,060 | 1/1942 | Case | 403/359 |
| 2,720,198 | 10/1955 | Scheiterlein | 123/195 A |
| 3,588,154 | 6/1971 | Voight et al. | 403/359 |
| 4,173,951 | 11/1979 | Ishihara | 123/2 |
| 4,304,501 | 12/1981 | Gordon et al. | 403/359 |
| 4,307,583 | 12/1981 | Hall | 123/195 A |
| 4,432,743 | 2/1984 | Pitoiset | 474/14 |

FOREIGN PATENT DOCUMENTS 773185 4/1957 United Kingdom .

Primary Examiner—Craig R. Feinberg
Attorney, Agent, or Firm—Charles E. Brown; Charles A. Brown

[57] ABSTRACT

In an automotive vehicle having an internal combustion engine, an arrangement of the auxiliary equipment units comprises an alternator and a compressor grouped together and driven in rotation at the same speed from the engine by common drive means. The alternator and the compressor are fastened together and centered coaxially with one another by an intermediate part by means of which they are also mounted on the side of the engine.

8 Claims, 7 Drawing Figures

ARRANGEMENT OF AUXILIARY EQUIPMENT UNITS FOR INTERNAL COMBUSTION ENGINED AUTOMOTIVE VEHICLES

BACKGROUND OF THE INVENTION

1. Field of the Invention

The present invention concerns equipment for an internal combustion engined automotive vehicle comprising items such as an alternator, a volumetric compressor and/or an air conditioning compressor rotationally coupled to the engine.

2. Description of the Prior Art

As is known, the alternator is particularly intended to recharge the battery, whereas the volumetric compressor is used to supercharge the engine. The air conditioning compressor provides for air conditioning the passenger space.

As a general rule, there is little space available for accommodating this equipment, which creates problems in driving the latter under optimum conditions. These problems are tending to become more severe since these devices are becoming increasingly complex and numerous in order to satisfy varying requirements, differing from one country or continent to another.

More often than not the equipment units are dispersed in locations which are widely separated from one another, often at opposite ends of the engine, even though this involves using complex and expensive transmission systems, with the objective of accommodating them within minimum overall dimensions. As a general rule this applies to the alternator and the volumetric compressor, which are widely separated from one another.

The present invention proposes to overcome these disadvantages by arranging the alternator and one of said compressors in line with one another so as to constitute a group which is driven in rotation at the same speed from the engine by common drive means.

The invention is more precisely directed towards an alternator-compressor assembly of moderate cost, which is easy to fit (in terms of alignment and centering) and of limited overall dimensions (both in the axial and radial directions).

SUMMARY OF THE INVENTION

In an automotive vehicle comprising an internal combustion engine having an engine housing, the invention consists in an arrangement of auxiliary equipment units comprising an alternator, a compressor coaxial with said alternator, an intermediate part whereby said alternator and said compressor are coupled together and centered relative to one another and are fixed to said engine housing, and common drive means adapted to drive said alternator and said compressor in rotation at the same speed from said engine.

This kind of association of a compressor with an alternator leads to minimum overall radial dimensions whilst facilitating the alignment and the centering of the equipment units thus combined.

According to one advantageous characteristic of the invention the intermediate part serves as the front casing for the compressor, representing a further gain in terms of overall axial dimensions.

While an alternator is required to operate continuously, this does not apply to a volumetric compressor or an air conditioning compressor, with the result that a clutch device is required between the alternator and the compressor. With a view to reducing the overall axial dimensions, the invention nevertheless calls for the rotational coupling of the shafts of the alternator and the compressor to be for preference permanent, by virtue of which the connection between these shafts is shortened.

Various systems for guiding and supporting the shafts are proposed which provide for further reduction in the overall axial dimensions.

Various solutions are also proposed for rotationally coupling the shafts of the alternator and the compressor where these are subject to slight alignment and centering faults, whether the rotational coupling is permanent or not.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

FIGS. 1 to 7 show by way of example various embodiments of an alternator-compressor arrangement which all comprise an intermediate part providing for the fastening together and centering of the alternator-compressor assembly and the attachment of said assembly laterally to one side of the engine. In each case, in accordance with an advantageous characteristic of the invention, this intermediate part forms a front casing for the compressor. These various alternator-compressor arrangement embodiments differ essentially in the precise manner in which the shafts of the alternator and the compressor are coupled in rotation, permanently or otherwise.

Figure 1:
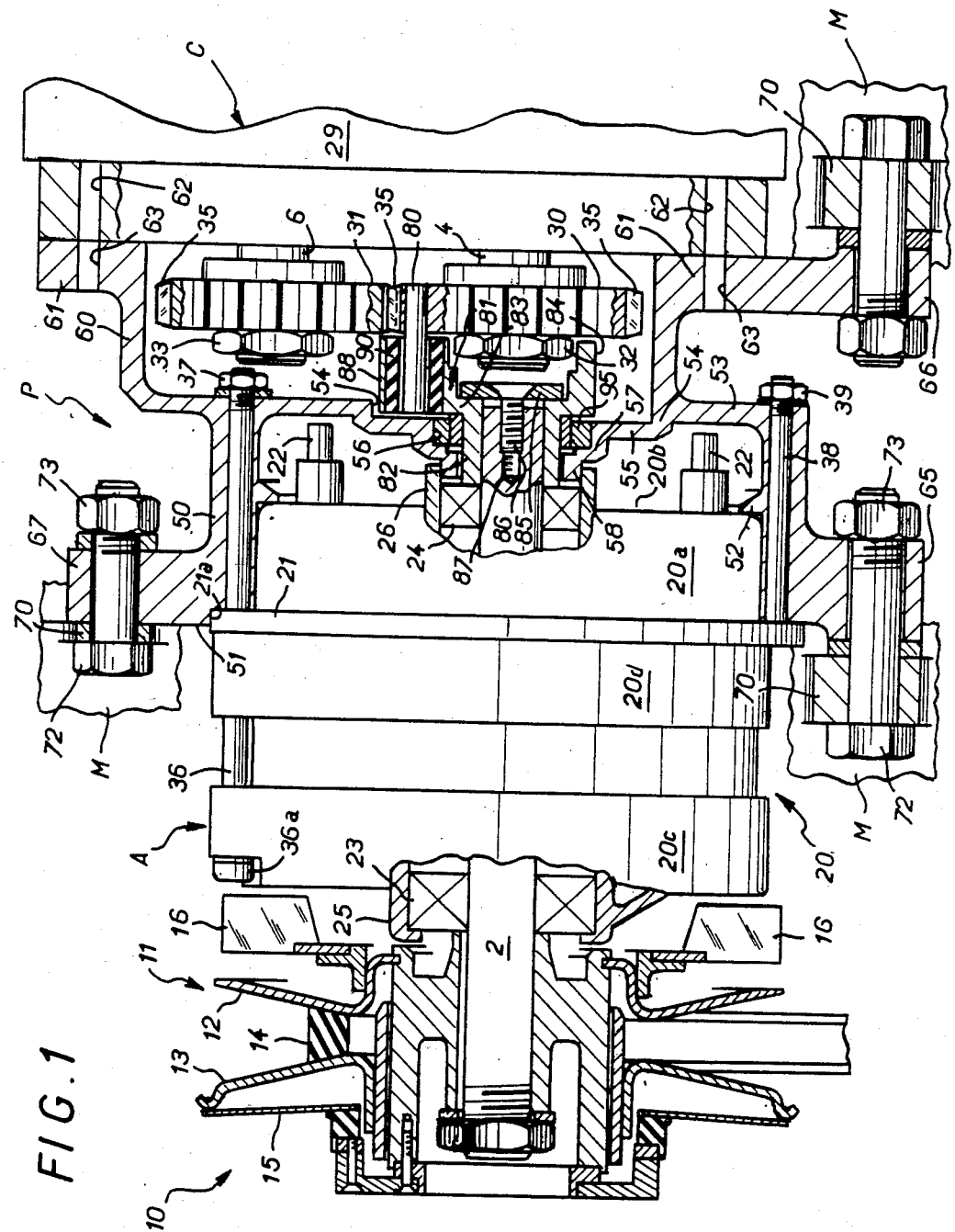
FIG. 1 is a partial lateral view, partially in longitudinal cross-section, of an alternator-compressor arrangement in accordance with the invention.

FIG. 1 shows an alternator A and a compressor C arranged coaxially; their respective shafts 2 and 4 are thus substantially aligned. This alternator and this compressor constitute a group and are driven in rotation at the same speed from the engine by common drive means 10. In the example of FIG. 1, these drive means 10 are essentially constituted by a variable speed drive formed by a driven pulley 11 mounted on the shaft 2 of the alternator, at the opposite end from the compressor, a driving pulley (not shown) mounted on the crankshaft of the engine M, and a transmission belt 14 which cooperates with these two pulleys. The pulley 11, like the aforementioned other pulley, comprises pulley halves 12 and 13 the distance between which can be varied, by virtue of which arrangement the speed ratio of the driving and driven pulleys may be varied as a function of any appropriate parameter, the engine shaft speed, for example. This variable speed drive will only be described in outline here since it is not of direct relevance to the invention and is, furthermore, fully described in U.S. Pat. No. 4,432,743. It suffices to indicate that the pulley half 12 consists of a fixed flange and that the pulley half 13, formed by an axially mobile flange, is acted on by an annular diaphragm spring 15 which urges the pulley halves closer together or further apart when acted on by, for example, flyweights responsive to centrifugal force.

Fan blades 16 are generally provided between the fixed pulley half 12 and the alternator A in order to cool the latter.

The structure of the alternator A is also well-known and will not be described in detail here. It suffices to indicate that the alternator is accommodated in a casing 20 comprising a front casing 20c and a rear casing 20d, which has, in the direction towards the compressor C, a transverse truing surface 21 and then a cover 20a, of plastics material, for example, through which terminals 22 extend axially, and that the shaft 2 is supported by a front bearing 23 carried by the front casing 20c and a rear bearing 24 carried by the rear casing 20d consisting in the conventional way of ball bearing positioned in respective fixed sleeves 25 and 26.

Likewise, the structure of the compressor C, which may be of any known type, will not be described in detail here. It will merely be stated that in the example shown it consists of a volumetric compressor comprising inside its casing 29, in addition to the primary shaft 4, a secondary shaft 6 parallel to the latter, and that these shafts are coupled in rotation by toothed wheels 30 and 31 mounted at the ends of said shafts 4 and 6 by means of nuts 32 and 33 and which mesh together by virtue of teeth 35. In accordance with an advantageous characteristic of the invention, the front cover which the casing 29 conventionally comprises in order to protect the toothed wheels is eliminated.

In accordance with the invention, the alternator and the compressor are fastened together so as to constitute a unitary assembly, by means of a generally annular intermediate part P inserted axially between the alternator and the compressor and attached to the casings 20 and 29.

As shown in FIG. 1, the intermediate part P comprises firstly a substantially cylindrical wall 50 centered on the axis of the shafts 2 and 4, the inside diameter of which is substantially equal to the outside diameter of the cover 20a of the alternator A. At the alternator end this wall 50 has a transverse surface 51 adapted to cooperate with the truing surface 21 of the casing 20 of the alternator for truing the part P with the latter. The wall 50 comprises on its inside a projecting rib 52 forming a shoulder for the perimeter of the transverse surface 20b of the rear cover 20a of the casing 20 of the alternator A. This cover 20a is thus closely enclosed by the intermediate part P, procuring axial retention of said cover which is centered in 21a by the alternator casing or as a variant by said intermediate part P.

At the compressor end the cylindrical wall 50 merges with a generally transverse wall 53 which features, in the direction towards the axis of the alternator-compressor assembly, an axial shoulder 54 linking it to an annular disk 55 delimited internally by a circular bearing surface 56. This bearing surface 56 in turn has an axial shoulder 57 and, closer still to the axis, a cylindrical bearing surface 58 adapted to penetrate with negligible clearance into the sleeve 26 in which is retained the ball bearing 24 guiding the alternator shaft 2. The intermediate part P thus has the function of centering the alternator shaft, advantageously by means of the ring 58 which its transverse wall 53 comprises internally.

The wall 50 is advantageously provided with ventilation apertures (not shown).

In the direction towards the compressor C, the wall 53 merges with a second wall 60 terminated by a transverse flange 61 adapted to bear against the engine housing 29 and surrounding the toothed wheels 30 and 31 of the compressor. By virtue of this wall 60 and the wall 53, the intermediate part P thus forms a front casing or cover for the compressor C. This advantageous characteristic provides for a reduction in the overall axial dimensions of the alternator-compressor assembly by virtue of the fact that it makes it possible to eliminate the front cover which the compresssor conventionally features without prejudice to the protection of the toothed wheels.

It will be noted that the intermediate part comprises, on respective sides of the wall 53, two chambers respectively enclosing the front of the compressor and the rear of the alternator.

In the example of FIG. 1 the intermediate part P is fastened to the alternator A by two types of nut-and-bolt devices oriented axially. A first type of nut-and-bolt device consists of bolts 36 with shouldered heads 36a passing through the perimeter of the largest sections of the casing 20 and cooperating with nuts 37. Another type of nut-and-bolt device is shown at the bottom of the casing 20 where a stud 38 upstands axially from the truing surface 21 and receives on its threaded end a nut 39.

These screws or studs pass through the intermediate part P in the thickness of the cylindrical wall 50 and the nuts 37 and 39 bear on this part P through the transverse wall 53. It should be noted that, because of the eccentricity of the wall 60 of the intermediate part P, the nuts 37 and 39 are respectively inside and outside the intermediate part, which must be taken into account in organizing the various operations to be carried out to obtain an alternator-compressor arrangement in accordance with the invention.

With regard to the fixing of the compressor C to the intermediate part P, only the bores 62 and 63 intended to accommodate the fastening members have been shown. Since the bores 62 are formed through the flange 61 of the intermediate part, which is thick, the bores 62 and 63 have the function of centering and aligning the compressor relative to the intermediate part when the shank of a bolt or a centering peg is inserted in them. In this way the alternator and the compressor are fastened together and centered in alignment with one another.

The intermediate part P has at its axial ends lugs adapted to cooperate with arms 70 upstanding from one side of the engine housing of the engine M in order to attach the alternator-compressor assembly to said side of the engine housing. In the example shown in FIG. 1, there are three of these lugs, two lugs 65 and 66 beneath the axis of the shafts 2 and 4 and one lug 67 above it. The lower lugs support most of the weight of the assembly A-P-C and are therefore preferably larger and stronger than the upper lugs. The same applies in the example shown to the arms 70 with which the aforementioned lugs respectively cooperate. The lugs and the arms are fastened together by any known means, by systems of bolts 72 and nuts 73 in the example shown, fitted into axial bores appropriately formed through the lugs and the arms.

In the example shown in FIG. 1, the rotational coupling of the shafts 2 and 4 of the alternator and the compressor, respectively, is brought about by pegs 80 which pass axially through the toothed wheel 30 mounted on the shaft 4 of the compressor and an annular flange 81 attached to the end of the shaft 2 of the alternator. This flange 81 comprises a sleeve 82 adapted to enclose one end of the shaft 2, a transverse surface 83 forming a shoulder and a larger sleeve 84 adapted to enclose without touching it the nut 32 by which the wheel 30 is mounted on the shaft 4 of the compressor. This flange is fixed to the ends of the shaft 2 by a washer pressed against the shoulder 83 by a bolt 86 cooperating with a threaded hole 87 formed in the shaft 2. The flange 81 comprises at the perimeter of its outside sleeve 84 as many lugs 88 as there are pegs. The latter pass through these lugs and are advantageously retained in them by means of elastic sleeves 90. The elasticity of the latter provides for an elastic coupling which is able to compensate any slight defect in the alignment of the shafts 2 and 4.

Between the annular bearing surface 56 of the wall 53 and the inside sleeve 82 of the added-on part there is disposed a sealing device 95 designed to prevent any escape of the toothed wheel lubricating oil from the compressor towards the alternator through the wall 53.

As has just been described, an intermediate part in accordance with the invention leads to minimum overall axial dimensions thanks to the minimum axial distances between the screw 36 and the shaft 6, between the wall 53 and the terminal 22, and between the disk 55 and the added-on part 81. The overall axial dimension of the alternator-compressor assembly is thereby reduced, and also the overhang which exists within the assembly by virtue of the fact that it is carried by the intermediate part alone.

Figure 2:
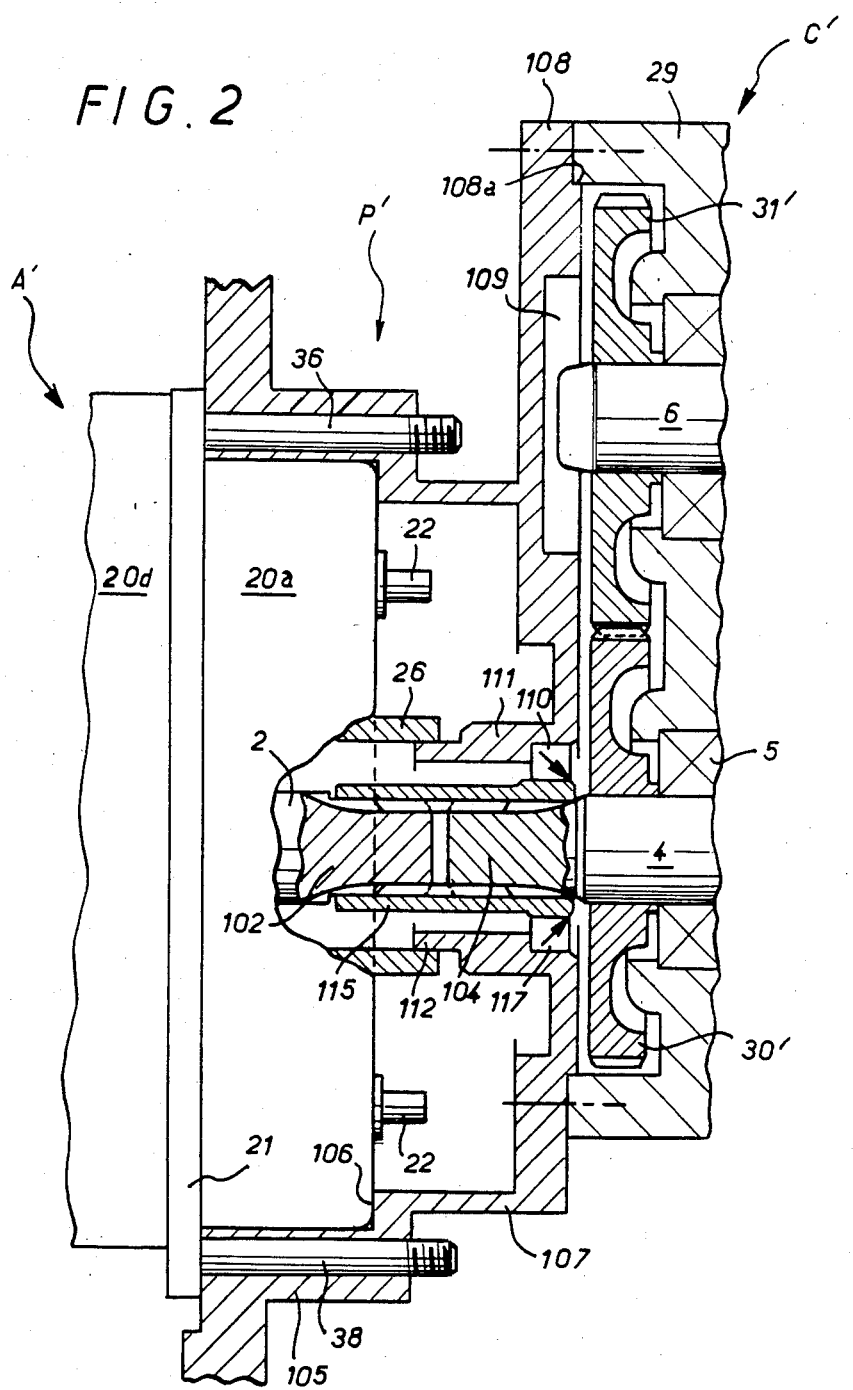
FIG. 2 is a partial longitudinal cross-section of a second embodiment.

FIG. 2 illustrates a second embodiment of an alternator-compressor arrangement in accordance with the invention. As previously, the alternator A' comprises a casing 20 with a surrounding truing surface 21 and a cover 20a through which pass terminals 22 and a shaft 2 surrounded by a centering sleeve 26. This shaft is axially splined at its end 102.

The compressor C' is of substantially the same design as that of FIG. 1; it differs from it essentially in the shape of the toothed wheels designated 30' and 31', their fastening to the primary shaft 4 and secondary shaft 6, and by the fact that said primary shaft 4 centered by a front bearing 5 is extended axially in the direction towards the alternator by an axially splined termination 104. Also, the casing 29 extends in the axial direction beyond the toothed wheels.

The intermediate part, here designated P' comprises, as in the example of FIG. 1, a substantially cylindrical wall 105 bearing axially against the truing surface 21 and enclosing the cover 20a of the alternator. As previously, this wall comprises lugs of which only the bases are shown. On the compressor side, this wall is bordered by a shoulder 106 adapted to bear axially against the aforementioned cover 20a which merges at its smaller diameter edge with a second annular wall 107 which merges with a substantially transverse wall 108.

This wall 108 is connected directly to the casing 29 of the compressor, given that the latter surrounds the toothed wheels 30' and 31'. It will be noted that this wall features an axial shoulder 108a for centering the casing 29.

The wall 108 comprises a recess 109 opposite the secondary shaft 6 of the compressor and a cylindrical bearing surface 110 in the vicinity of the splined end 104 of the primary shaft 4. In the vicinity of the aforementioned bearing surface the wall 108 comprises a sleeve 111 which terminates in the direction towards the alternator in a cylindrical bearing surface 112 adapted to be engaged with slight clearance inside the sleeve 26 of the shaft 2 of the alternator to center the latter.

The intermediate part P' is attached to the respective casings 20 and 29 of the alternator and the compressor by any appropriate means, such as those mentioned with reference to FIG. 1. The bolts 36 and 38 have been shown without their nuts, while the means for attaching the intermediate part P' to the casing 29 are merely indicated by chain-dotted lines.

The rotational coupling of the shafts 2 and 4 is achieved by means of an internally splined sleeve 115 engaged over the externally splined ends of the shafts 2 and 4.

Sealing members 117 disposed between the part 110 of the intermediate part and the splined sleeve 115 in the radial direction are intended, as previously, to avoid any leakage of oil towards the alternator through the wall 108 of the intermediate part P'.

It should be noted that the splined sleeve 115 extends axially into the inside of the cover 20a of the alternator, through the location for the rear bearing 24 which the alternator of FIG. 1 comprises. The presence of the sleeve 115 means that the shaft 2 cannot be supported by a ball bearing as in the example of FIG. 1.

In the example of FIG. 2, the alternator A' does not comprise any rear bearing, the shaft 2 of the alternator being guided and supported by a front bearing (see FIG. 1) and by the sleeve 115, which presupposes substantially perfect centering and alignment of the shafts 2 and 4. There is substantially no radial clearance between the sleeve and these shafts.

Figure 3:
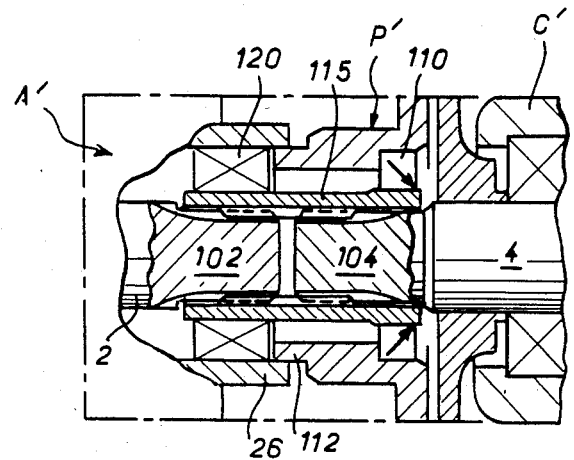
FIG. 3 shows a detail of a variation on FIG. 2.
Figure 4:
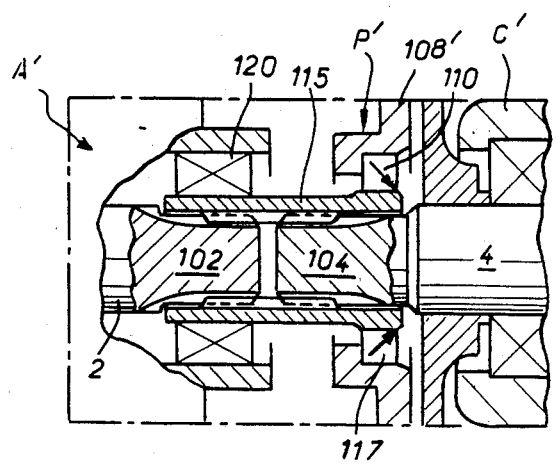
FIG. 4 shows a detail of another variation on FIG. 2.
Figure 5:
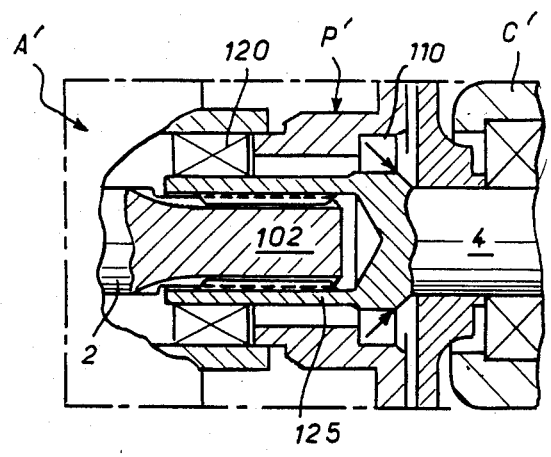
FIG. 5 shows a detail of a further variation on FIG. 2.

FIGS. 3 to 5 show embodiments in which slight alignment and centering defects may be compensated by virtue of the use of rear bearings in the form of needle roller bearings rather than ball bearings, since their overall radial dimension is smaller.

A needle roller bearing of this kind is shown at 120 in FIG. 3; it is disposed between the sleeve 26 of the shaft 2 of the alternator and the splined sleeve 115 in the radial direction. The shaft 2 is thus guided at the rear of the alternator by the splined sleeve 115 coupling it in rotation to the shaft 4 of the compressor. A certain radial clearance is maintained between the sleeve 115 and the splined ends 102 and 104 of the shafts 2 and 4 for the purposes of compensating alignment or centering defects.

FIG. 4 shows an embodiment analogous to that of FIG. 3. However, the intermediate part P' comprises a wall 108' provided, near the sleeve 115, with a bearing surface 110 adapted to receive a lip seal 117 but not comprising any axial extension towards the alternator for centering the sleeve 26 of the shaft 2. Thus in this instance the intermediate part P' does not contribute to centering said sleeve. In this case the alternator is centered relative to the intermediate part by the cooperation of the edge of the surface 21 with a circumferential bearing surface provided for this purpose in the intermediate part P', for example.

In practice, the presence of a cylindrical bearing surface or ring as represented with the reference numerals 58 and 112 respectively in FIGS. 1 and 1, although highly advantageous, is not an essential characteristic of the invention when the alternator shaft comprises front and rear bearings or when the shafts to be coupled together are correctly aligned and centered by some other means.

FIG. 5 shows another variation on FIG. 2 in which the splined coupling sleeve 125 is fastened to one of the two shafts to be coupled together, the primary shafts of the compressor in this instance, which therefore no longer comprises any externally splined end. The coupling sleeve then cooperates with the shaft 2 of the alternator over a greater splined length.

In a variation (not shown) on FIG. 5, the bearing 120 is eliminated, the centering of the sleeve 125 resulting from that of the shaft 4. In a further non-illustrated variation the coupling sleeve is attached to the shaft 2. In the embodiments previously described with reference to FIGS. 1 to 5, the respective shafts 2 and 4 of the alternator and compressor are continuously coupled in rotation. This requires that other means be provided for opening and closing the compressor outlet circuit as required in that, as is known, the compressor, whether a volumetric or air conditioning compressor, is not required to operate continuously. This arrangement makes it possible to avoid the use of a clutch device; this results in a reduction in the manufacturing costs of the alternator-compressor assembly, since a clutch device of this kind is expensive.

However, the invention is also applicable to an alternator-compressor assembly featuring intermittent coupling and comprising a clutch.

Figure 6:
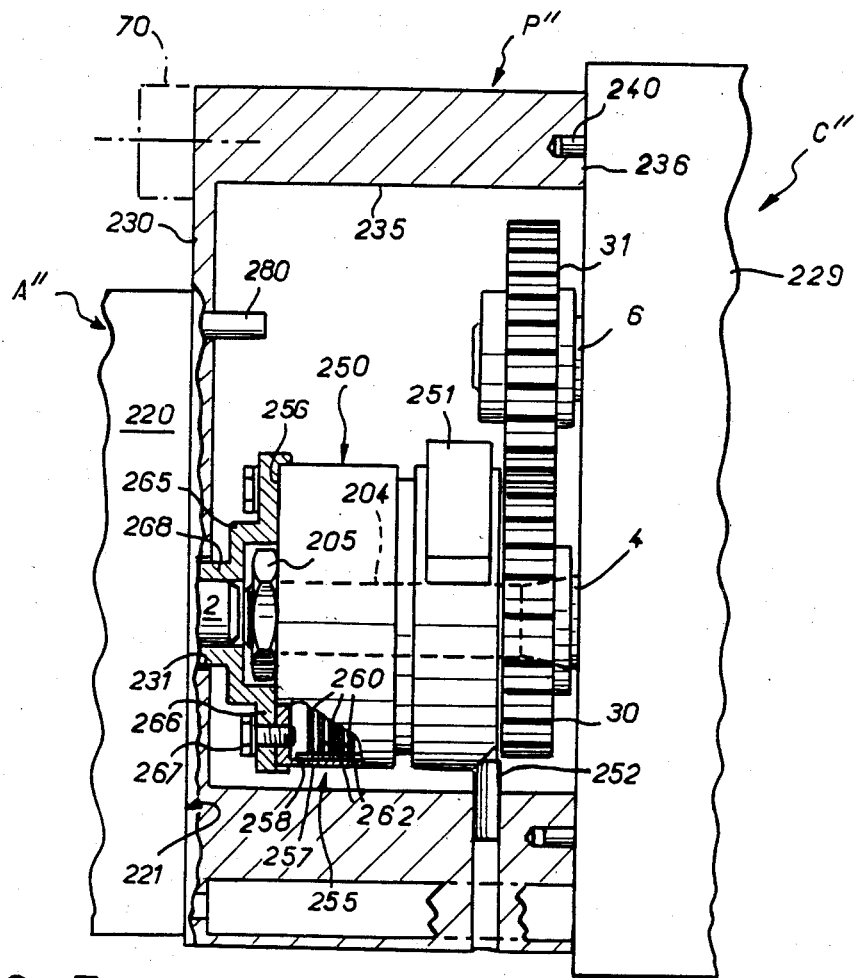
FIG. 6 is a partial longitudinal cross-section through a third embodiment of the arrangement in accordance with the invention.
Figure 7:
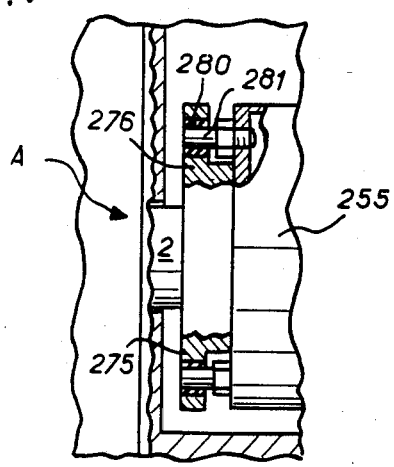
FIG. 7 shows a detail of a variation on FIG. 6.

FIGS. 6 and 7 show alternator-compressor assemblies in which intermittent rotational coupling is provided by means of a multi-disk clutch.

FIG. 6 shows an intermediate part P'' fastening together coaxially an alternator A'' and a compressor C''.

The alternator comprises a shaft 2 in a casing 20 which is extended axially as far as the end of the shaft 2 designed to be coupled to the compressor; the edge of this casing facing the compressor constitutes a truing surface 221.

As previously, the compressor C'' comprises a casing 229 from which projects in the axial direction the primary shaft 4 and secondary shaft 6 fitted with toothed wheels 30 and 31 to couple them in rotation. The primary shaft 4 is extended beyond the corresponding toothed wheel 30 by a projecting termination 204 to a point close to the aforementioned end of the shaft 2.

Around the termination 204 of the shaft 4 of the compressor there is disposed an electromagnetic clutch device 250 comprising a coil 251 which is fixed in the example shown. A radial peg 252 is fitted through the intermediate part P'' to prevent said coil rotating.

The clutch device 250 also comprises a casing 255 comprising an annular base 256 and a cylindrical wall 257. The latter comprises projecting axial ribs 258.

The casing 255 contains a first plurality of disks 260 and a second plurality of disks 262 coupled in rotation to the driving shaft 2 and driven shaft 4, respectively, but free to move axially.

The disks 260 are coupled to the shaft 2 by the casing 255, more precisely by the axial ribs 258 which cooperate with notches formed axially in the perimeter of said disks 260. The casing 255, unrestrained with respect to the driven shaft 4 and its termination 204, is attached to the shaft 2 by a linking member 265 comprising a flange 266 for the attachment, by any appropriate means 267, of the casing 255 and a sleeve 268 adapted to enclose the coupling end of the shaft 2 and to be attached to it.

The disks 262 are coupled to the shaft 4 in the converse manner, at their inside edge and by any known means, for example by means of a splined hub (not shown) fixed to the termination 204 of the shaft 4 by a nut 205.

The disks 262 have a circular outside edge of smaller diameter than the disks 260, and by virtue of this they do not reach as far as the ribs 258.

The disks 260 are mounted with clearance in the casing 255 and by virtue of this their normals accommodate slight angular movement relative to the shaft 2 of the alternator A''. This provides for compensating slight alignment or centering defects between the alternator and compressor shafts.

If this compensation provision proves inadequate, the embodiment of FIG. 7 may be used, in which the casing 255 is attached to the shaft 2 by a linking part 275 comprising a flange 276 within the thickness of which are disposed elastic rings 280 in which are engaged centering pegs 281 fixed to said casing 255. This provides additional capacity for compensating alignment or centering defects.

Irrespective of its specific assembly, the electromagnetic clutch device 250 operates in the oil lubricating the movement distribution devices of the compressor.

It is placed in the intermediate part P'' which, in the example of FIG. 6, is of very simple shape since it comprises an oiltight wall 230 adapted to be applied against the truing surface 221 and a lateral wall 235 adapted to be applied through its edge 236 against the casing 229.

The intermediate part P'' ensures the reciprocal alignment and centering of the alternator A'' and the compressor C'' by means of centering pegs 240 shown in FIG. 6 as attached to the casing 229 of the compressor C'' and the casing 220 of the alternator A''.

The components A'', P'' and C'' are fastened together by any appropriate means (not shown), particularly of the kind previously mentioned with reference to FIG. 1. As to the attachment of the combination A''-P''-C'' to one side of the engine, only one arm 70 is shown (in chain-dotted line) and the fastening devices are schematically represented by a chain-dotted line. The part P'' comprises other attachment lugs (not shown) adapted to cooperate with other coupling arms on the engine (also not shown).

It will be understood that various changes in the details, materials and arrangements of parts which have been herein described and illustrated in order to explain the nature of the invention may be made by those skilled in the art within the principle and scope of the invention as expressed in the appended claims.

For example, the precise shape of the intermediate part has to be adapted according to the construction of the alternators and compressors used. The details of the means for attaching the intermediate part to the alternator and to the compressor and to the engine itself are also subject to numerous modifications.

Finally, any other means of rotationally coupling the shafts of the alternator and the compressor, intermittently or otherwise, may be proposed without departing from the scope of the invention. For example, the coupling sleeve may be mounted without clearance on one shaft and with clearance on the other, which provides in certain cases for implementing a rotational coupling with a limited number of centering means whilst accepting slight defects in respect of the alignment and centering of the alternator and compressor shafts. Also, the cooperation between the coupling sleeve and the facing ends of the shafts may be brought about by means other than axial splines.

We claim:

1. In a vehicle comprising an internal combustion engine for said vehicle having an engine housing, an arrangement of auxiliary equipment units for said internal combustion engine comprising an alternator including an alternator shaft journalled in an alternator casing, a compressor coaxial with said alternator and including a separate compressor shaft journalled in a compressor casing, an intermediate part fixing said alternator casing and said compressor casing together and to said engine housing, said alternator shaft and said compressor shaft being substantially axially aligned, and common drive means for driving said alternator and said compressor in rotation at the same speed from said engine comprising a coupling sleeve and wherein said alternator shaft and said compressor shaft have facing ends which are coupled together in rotation by said coupling sleeve, said facing ends of said alternator and compressor shafts are formed with axial splines and said coupling sleeve has axial internal splines cooperating with said splines on said shafts, wherein said coupling sleeve is mounted with play on said alternator shaft splines and further comprising a sleeve on said alternator casing into which said coupling sleeve extends, and a bearing by means of which said coupling sleeve is centered in said sleeve of said casing.

2. Arrangement according to claim 1, wherein said alternator and said compressor are disposed laterally relative to said engine housing.

3. Arrangement according to claim 1, wherein said intermediate part constitutes a front cover of said compressor casing.

4. Arrangement according to claim 1, wherein said coupling sleeve is attached to one of said shafts to be coupled together and has its axial internal splines and the other of said shafts is formed with its axial splines on the end facing said coupling sleeve adapted to cooperate with said splines in said coupling sleeve.

5. Arrangement according to claim 4, wherein said coupling sleeve is attached to said compressor shaft.

6. Arrangement according to claim 1, wherein said intermediate part comprises a transverse wall in there is an opening centered on the common axis of said alternator and said compressor.

7. Arrangement according to claim 6, wherein said wall defines two axially open chambers respectively enclosing the front of said compressor and the rear of said alternator.

8. Arrangement according to claim 7, wherein said alternator casing has a truing surface directed towards said compressor and a rear cover, and wherein said chamber enclosing the rear of said alternator comprises a cylindrical wall having an edge and a radially inwardly projecting rib simultaneously bearing axially on said truing surface and said rear cover of said alternator.

* * * * *